US009467028B2

(12) United States Patent
Zeng et al.

(10) Patent No.: US 9,467,028 B2
(45) Date of Patent: Oct. 11, 2016

(54) ELECTRIC MOTOR

(71) Applicant: Johnson Electric S.A., Murten (CH)

(72) Inventors: Hua Ping Zeng, Shenzhen (CN); Siu Kin Tam, Hong Kong (CN); Yuk Wai Elton Yeung, Hong Kong (CN)

(73) Assignee: JOHNSON ELECTRIC S.A., Murten (CH)

( * ) Notice: Subject to any disclaimer, the term of this patent is extended or adjusted under 35 U.S.C. 154(b) by 286 days.

(21) Appl. No.: 13/895,151

(22) Filed: May 15, 2013

(65) Prior Publication Data

US 2013/0307380 A1    Nov. 21, 2013

(30) Foreign Application Priority Data

May 17, 2012    (CN) .......................... 2012 1 0153999

(51) Int. Cl.
*H02K 9/00*    (2006.01)
*H02K 11/02*    (2016.01)

(52) U.S. Cl.
CPC ........... *H02K 11/024* (2013.01); *H02K 11/026* (2013.01)

(58) Field of Classification Search
CPC ......... H02K 11/0068; H02K 11/0073; H02K 11/02; H02K 11/022; H02K 11/024; H02K 11/026; H02K 11/028; H02K 9/06; H02K 5/20; H01L 2924/00; H01L 2924/00014; H01L 2224/32225; H01L 2224/73265
USPC ............. 310/68 R, 68 C, 71, 72, 60 R, 60 C, 310/40 MM; 361/816, 818; 257/98, 773, 257/774; 438/107, 113
See application file for complete search history.

(56) References Cited

U.S. PATENT DOCUMENTS

| 3,924,147 | A | * | 12/1975 | Tarnow et al. ............. 310/68 R |
| 4,329,605 | A | * | 5/1982 | Angi .................... H02K 11/024 |
| | | | | 307/105 |
| 5,196,750 | A | * | 3/1993 | Strobl .......................... 310/239 |
| 5,610,467 | A | * | 3/1997 | Shiah et al. ................... 310/239 |
| 5,914,862 | A | * | 6/1999 | Ferguson et al. ............. 361/737 |
| 6,078,117 | A | * | 6/2000 | Perrin .................... B60N 2/448 |
| | | | | 310/220 |
| 6,400,058 | B1 | * | 6/2002 | Liau ............................. 310/239 |
| 6,858,955 | B2 | * | 2/2005 | Lau ................................ 310/51 |
| 2002/0075660 | A1 | * | 6/2002 | Samant et al. ................ 361/752 |
| 2004/0145273 | A1 | * | 7/2004 | Khoury et al. .......... 310/316.03 |
| 2005/0189829 | A1 | * | 9/2005 | Thomson et al. .............. 310/71 |
| 2006/0022317 | A1 | * | 2/2006 | Liu et al. ...................... 257/676 |
| 2010/0181853 | A1 | * | 7/2010 | Wong et al. .................... 310/72 |
| 2011/0018377 | A1 | * | 1/2011 | Zhao et al. ..................... 310/72 |
| 2012/0026639 | A1 | * | 2/2012 | Wright et al. ................ 361/118 |

OTHER PUBLICATIONS

Duff, William G. (2011). Designing Electronic Systems for EMC—8.4.2.2 Varistors. SciTech Publishing. Online version available at: http://app.knovel.com/hotlink/pdf/id:kt00CCI8N1/designing-electronic/varistors.*

* cited by examiner

*Primary Examiner* — Hanh Nguyen
(74) *Attorney, Agent, or Firm* — Muncy, Geissler, Olds & Lowe PC

(57) ABSTRACT

An electric motor has a stator, a rotor, two motor terminals and a filter circuit for suppressing electromagnetic interference. The filter circuit includes a flexible circuit assembly having a FPCB. Multiple filter elements are mounted to the FPCB. There are less connection points between the filter circuit and the motor terminals, which leads to higher reliability of the motor.

20 Claims, 5 Drawing Sheets

ELECTRIC MOTOR

CROSS REFERENCE TO RELATED APPLICATIONS

This non-provisional patent application claims priority under 35 U.S.C. §119(a) from Patent Application No. 201210153999.4 filed in The People's Republic of China on May 17, 2012.

FIELD OF THE INVENTION

The present invention relates to an electric motor and in particular, to a miniature PMDC motor having electromagnetic interference suppression.

BACKGROUND OF THE INVENTION

Miniature permanent magnet direct current (PMDC) electric motors are widely used in many products, including being used to control the throttle valve of an internal combustion engine of a vehicle. Computer equipment used in modern vehicles are often sensitive to electromagnetic interference (EMI). Therefore, electric motors used in vehicles usually need to be shielded or incorporate noise suppression devices to prevent generating EMI which could interfere with the normal operation of the computer equipment.

U.S. Pat. No. 6,400,058 discloses an electric motor with a circuit for suppressing electromagnetic interference. In this motor, a rigid printed circuit board (PCB) is fixed to the brush holder which supports two brush cages. Two leaded resistors and two leaded capacitors are disposed on the PCB so as to suppress EMI generated by arcing between the commutator and the brushes, in this electric motor, wire is needed to connect the PCB to the motor. Additionally, leaded components occupy a relatively large space making it difficult to reduce the physical size of the motor.

SUMMARY OF THE INVENTION

Thus there is a desire for a motor having a compact EMI suppression circuit.

Accordingly, in one aspect thereof, the present invention provides a An electric motor, comprising: two motor terminals; a stator; a rotor rotatably mounted with respect to the stator; and a filter circuit for suppressing electro-magnetic interference, connected to the motor terminals, wherein the filter circuit comprises a flexible circuit assembly having a flexible printed circuit board (FPCB) and multiple filter elements mounted to the FPCB.

Preferably, the rotor has a shaft, a rotor core mounted on the shaft, a commutator mounted on the shaft adjacent the rotor core, a rotor winding wound about poles of the rotor core and electrically connected to the commutator. The stator has a end cap assembly. Two brushes are mounted on the end cap assembly and arranged to make sliding contact with the commutator and the filter circuit is electrically connected between the motor terminals and the brushes.

Preferably, the FPCB includes a flexible substrate, and a first electric contact and a second electric contact extending from the flexible substrate and bent relative to the flexible substrate, the first electric contact and the second electric contact are directly connected to the motor terminals respectively.

Preferably, the first electric contact and the second electric contact are welded to the motor terminals.

Preferably, the first electric contact and the second electric contact are connected to the two motor terminals by ultrasonic welding.

Preferably, the end cap assembly includes a first cap body and a separately formed second cap body, the flexible circuit assembly being disposed between the first cap body and second cap body.

Preferably, the first cap body is a metal cap body, and the FPCB includes a third electric contact that extends from the flexible substrate, is bent relative to the flexible substrate, and is directly connected to the metal cap body.

Preferably, the second cap body is an electrically insulating cap body with multiple recesses accommodating the multiple filter elements.

Preferably, the filter circuit includes two chokes supported by the end cap assembly, and ends of each choke are electrically connected to a respective one of the motor terminals and a corresponding one of the brushes.

Preferably, the second cap body has a first side and a second side axially spaced from the first side, and the flexible circuit assembly is disposed on the first side and the chokes are disposed on the second side of the second cap body.

Preferably, the filter elements include a resistor branch circuit, a first capacitor branch circuit and a second capacitor branch circuit that are connected in parallel between the motor terminals; the resistor branch circuit includes two resistors connected in series, the first capacitor branch circuit includes two capacitors connected in series; the second capacitor branch circuit includes a single capacitor, and the joint between the two resistors and the joint between the two capacitors of the first capacitor branch circuit are grounded.

Preferably, the filter elements are SMD elements.

Preferably, the FPCB is a single-side film circuit board with a thickness of 0.1 mm to 0.2 mm, or a double-sided film circuit board with a thickness of 0.2 mm to 0.3 mm.

BRIEF DESCRIPTION OF THE DRAWINGS

A preferred embodiment of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

Figure 1:
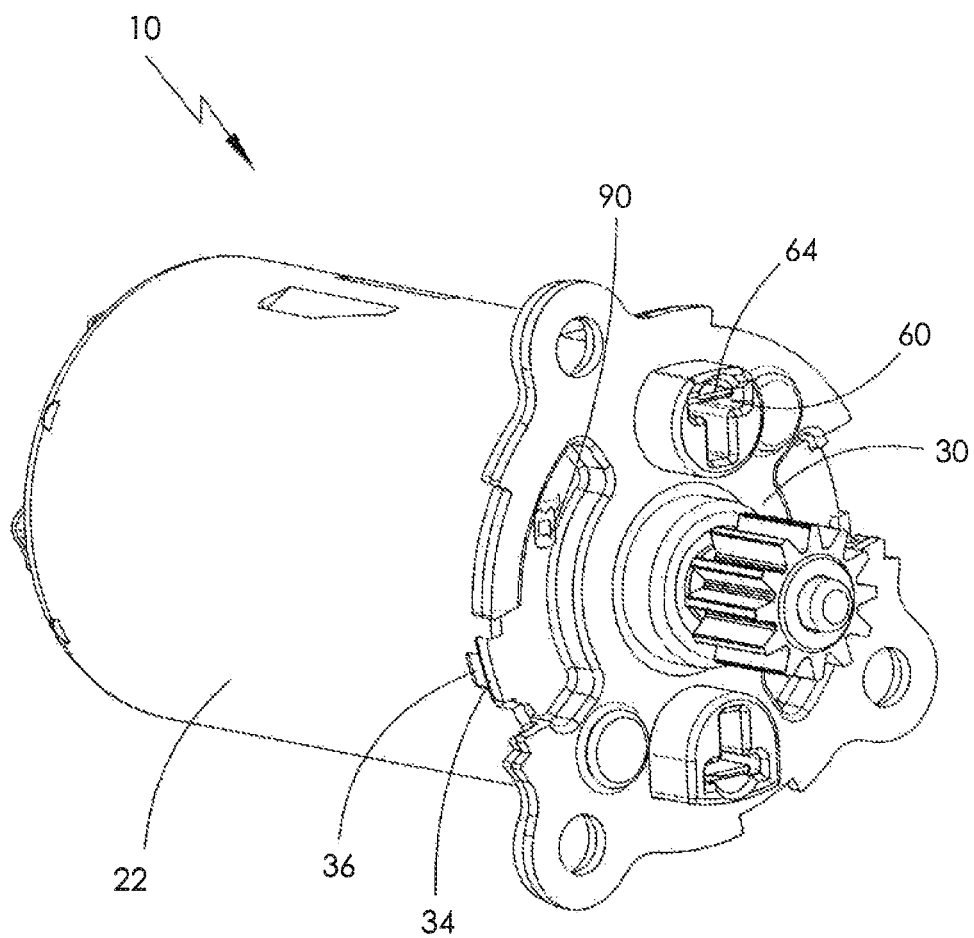
FIG. 1 shows an electric motor in accordance with the preferred embodiment of the present invention.
Figure 2:
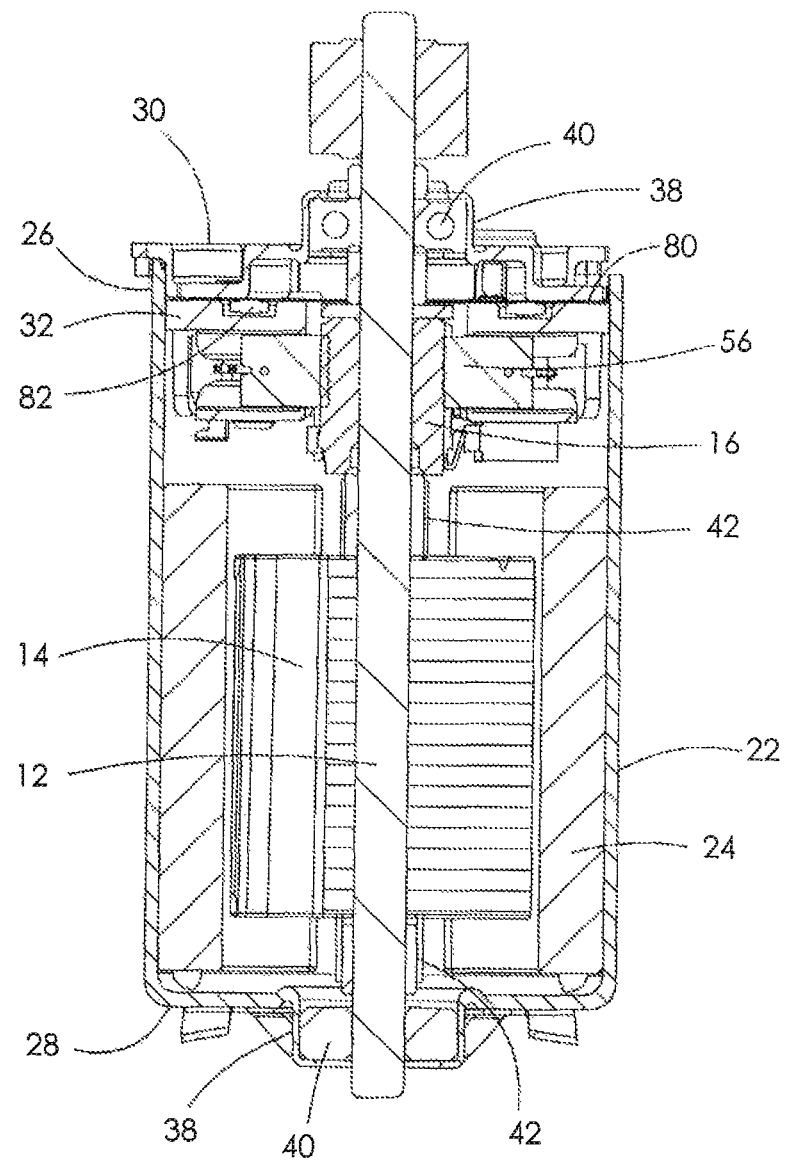
FIG. 2 is a sectional view of the motor of FIG. 1.

FIG. 1 and FIG. 2 illustrate an electric motor 10 in accordance with the preferred embodiment of the present invention. This motor is a miniature motor, designed for use in an electric throttle valve for an internal combustion engine. It includes a stator and a rotor rotatable relative to the stator. The rotor includes a shaft 12, a laminated rotor core 14 and a commutator 16 fixed on the shaft 12. A rotor winding (not shown in Figures) is wound on poles of rotor core 14 and electrically connected to the commutator. The stator includes a magnetically conductive housing 22, at least one magnet 24 fitted to the housing and an end cap assembly. Housing 22 has an open end 26 and a closed end 28. The end cap assembly closes the open end 26. The end cap assembly includes a first cap body 30 made of metal material, and a second cap body 32 made of electrical insulating material (e.g., plastic) disposed in the inner side of the first cap body. First cap body 30 and second cap body 32 respectively form tongue in groove positioning structures 34 and 36 with housing 22 so as to avoid relative moment there between in the circumferential direction. Two bearing holders 38 protrude outwardly along the shaft axis from the middle of closed end 28 and first cap body 30 respectively. Shaft 12 is rotatably supported by two bearings 40 installed in the two bearing holders. Spacers 42 are disposed between rotor core 14 and commutator 16 and between rotor core 14 and bearing 40 of closed end 28 of the housing.

Figure 3:
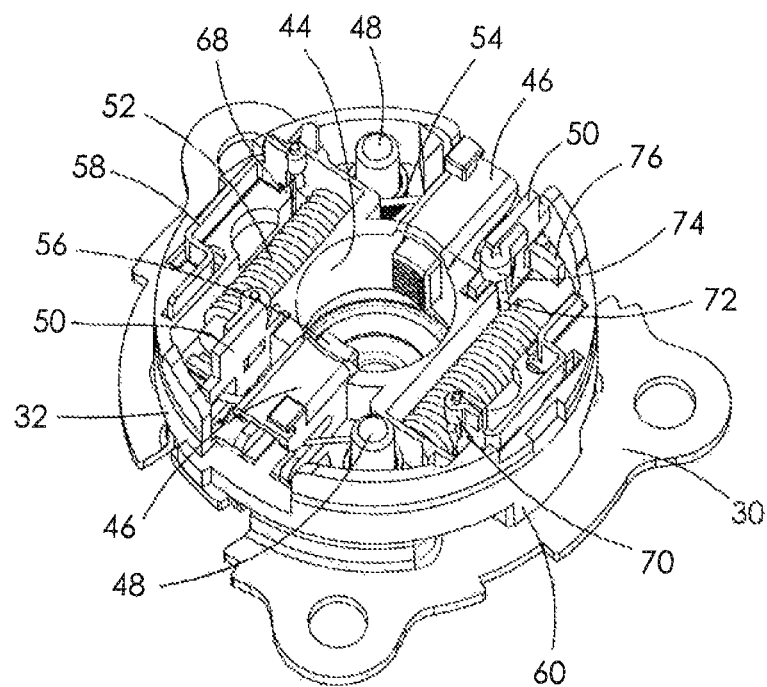
FIG. 3 illustrates an inside view of an end cap assembly of the motor of FIG. 1.
Figure 4:
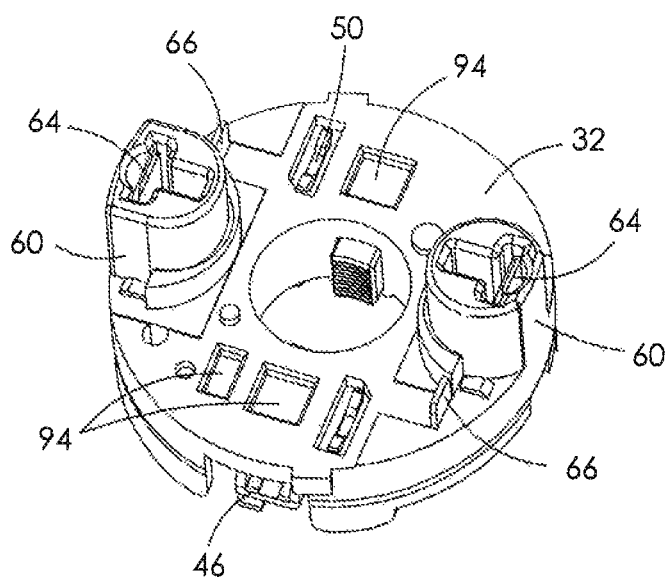
FIG. 4 illustrates an outside view of a second cap body, being a part of the end cap assembly of FIG. 3.

Referring to FIG. 3 and FIG. 4, an axial through hole 44 is formed in the middle of second cap body 32. Two brush cages 46 extend outwardly from the wall of the through hole along a common diagonal. Each brush cage 46 is through with axial through hole 44. Two protruding columns 48 integrally formed on second cap body 32 to support brush springs 54. Two metal conductors 50 are fixed to second cap body 32. Protruding columns 48 and metal conductors 50 are disposed on opposite sides of a respective brush cage 46 in the circumferential direction. Two chokes 52 are disposed on opposite sides of the common diagonal line defined by the two brush cages 46 and fixed to the second cap body 32. Thus, two brush cages 46, two protruding columns 48, two chokes 52 and two metal conductors 50 are disposed circumferentially about the through hole on the axially inner side of the second cap body 32. Brushes 56 are slidably disposed within brush cages 46. When assembled, commutator 16 is located in axial through hole 44 and the springs 54 urge the brushes into contact with the commutator. Two motor terminals 58, fixed to second cap body 32, are disposed on radially outer sides of each choke 52, respectively. Two insert portions 60 corresponding to the two motor terminals 58 extend outwardly from the second cap body 32 and extend through corresponding holes 62 in the first end cap body 30.

Each motor terminal 58 has a first connecting portion 64 that extends through second cap body 32 and is disposed in a recess formed in the corresponding insert portions 60, a second connecting portion 66 that extends through second cap body 32 and is located close to the corresponding insert portion 60 on the outside of second cap body 32, and a third connecting portion 70 that is connected to a first terminal 68 of a corresponding chokes 52 on the inside of second cap body 32. Each insert portion 60 and first connecting portion 64 therein together form an electric socket for connecting to an external power source. A second terminal 72 of each choke 52 is electrically connected to a fourth connecting portion 74 of a corresponding metal conductor 50. Brush 56 is electrically connected to a fifth connecting portion 76 corresponding to metal conductor 50 by a brush shunt.

Figure 5:
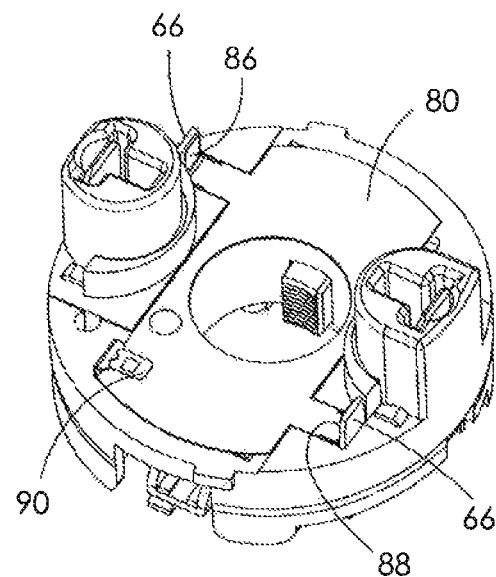
FIG. 5 illustrates a FPCB assembly disposed on the outside of the second cap body of the end cap assembly of FIG. 3.
Figure 6:
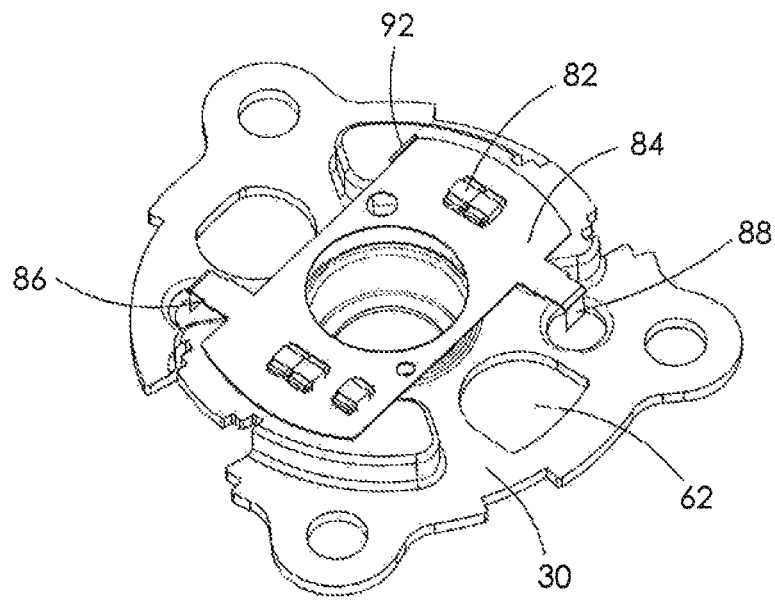
FIG. 6 illustrates the FPCB assembly disposed on an inside of a first cap body of the end cap assembly of FIG. 3.

Referring to FIG. 5 and FIG. 6, in the preferred embodiment, a flexible circuit assembly is fixedly installed on the outer surface of the second cap body between first cap body 30 and second cap body 32. This flexible circuit assembly has a flexible printed circuit board (FPCB) 80 and some filter elements 82 mounted on the FPCB. The FPCB includes a flexible substrate 84, a first electric contact 86, a second electric contact 88 and a third electric contact 90 that are all bent relative to flexible substrate 84. First to third electric contacts 86, 88, 90 may be formed by three portions integral with flexible substrate 84 and bent out from an edge of flexible substrate 84. Wherein, first electric contact 86 and second electric contact 88 are connected (preferably by welding) to second connecting portion 66 of the two motor terminals 58, and third electric contact 90 is connected (preferably by welding) to first end body 30 through a hole 92 formed therein to form an earth terminal.

Preferably, the filter elements 82 are contained in one or more recesses 94 formed in the outer face of second end body 32, to reduce the axial length of the motor. Electric contacts 86, 88, and 90 may be connected to motor terminals 58 and first end body 30 by ultrasonic welding, so as to ensure the reliability of the connection for the motor operating in a variety of temperature conditions.

Preferably, FPCB is single-side Film Circuit Board, with a thickness as thin as 0.1 mm~0.2 mm. Filter elements 82 are Surface Mounted Device (SMD) elements, that can be disposed on one side of FPCB by Surface Mounted Technology (SMT). The total thickness of FPCB and filter elements 82 may be as thin as 1.2 mm.

Figure 7:
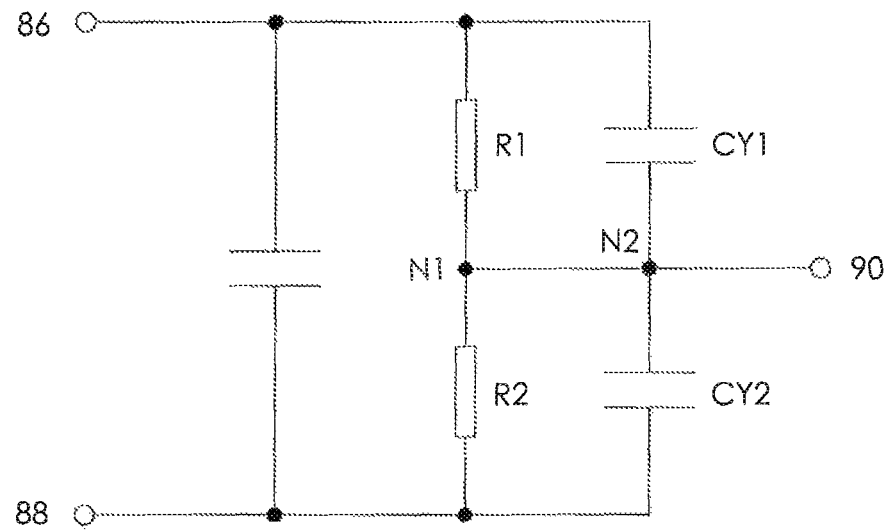
FIG. 7 is a circuit diagram of the FPCB assembly of FIG. 5.
Figure 8:
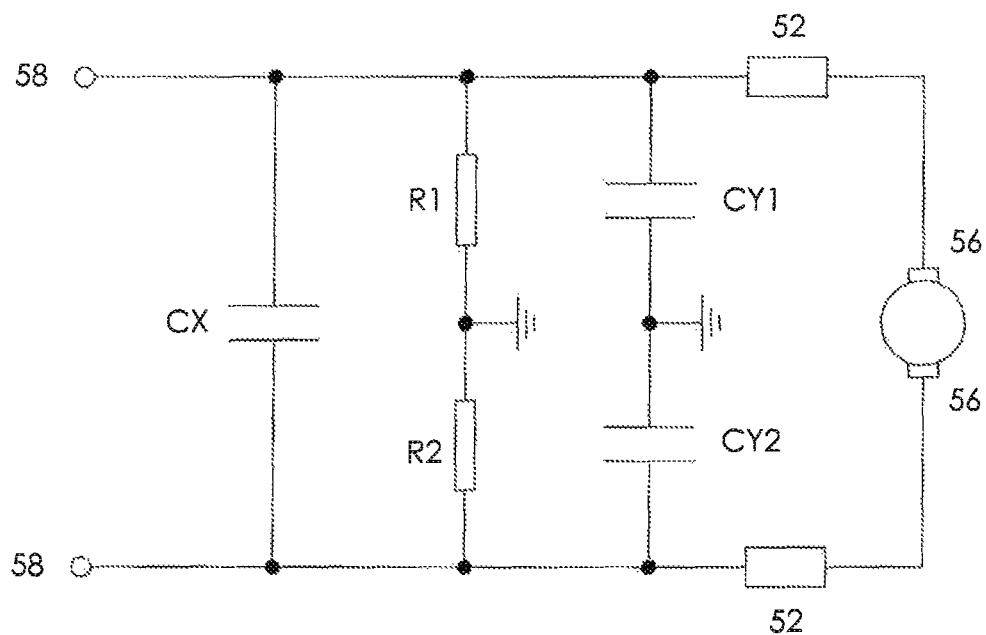
FIG. 8 is a circuit diagram of the whole motor of FIG. 1.

FIG. 7 shows the circuit diagram of the circuit of FPCB. The circuit has a resistance branch, a first capacitance branch and a second capacitance branch, all connected between first electric contact 86 and second electric contact 88. The resistance branch includes two resistors R1 and R2 connected in series. First capacitor branch includes two capacitors CY1 and CY2 connected in series. Second capacitor branch includes a single capacitor CX. Connection point N1 of the two resistors R1 and R2 and connection point N2 of the two capacitors CY1 and CY2 are connected to the third electric contact 90. FIG. 8 shows the complete circuit diagram of the motor of the preferred embodiment, wherein FPCB and chokes 52 form a filter circuit electrically connected between the two motor terminals 58 and brushes 56.

In accordance with an embodiment of the present invention, FPCB is used in the filter circuit, so electric contacts can be formed directly by bending portions of the FPCB for electrically connecting to motor terminals, and no extra wires are needed to be connected between the PCB and the motor terminals. Thus there are less welding or connection points between the filter circuit and the motor terminals, which leads to higher reliability of the circuit. Due to the application of film circuit board and SMD filter elements 82, the thickness and volume of the flexible circuit assembly becomes smaller, so that it can meet the requirements of miniature motor. Additionally, more filter components, or components with greater capacity, can be used in the circuit, so that better EMI suppression can be achieved.

In the description and claims of the present application, each of the verbs "comprise", "include", "contain" and "have", and variations thereof, are used in an inclusive sense, to specify the presence of the stated item but not to exclude the presence of additional items.

Although the invention is described with reference to one or more preferred embodiments, it should be appreciated by those skilled in the art that various modifications are possible. Therefore, the scope of the invention is to be determined by reference to the claims that follow.

For example, FPCB can be a double-sided film circuit board, with a thickness of 0.2~0.3 mm, with filter components, preferably of the SMD component type, installed on the both sides of the FPCB.

The invention claimed is:

1. An electric motor, comprising:
   two motor terminals;
   a stator;
   a rotor rotatably mounted with respect to the stator; and
   a filter circuit for suppressing electro-magnetic interference, connected to the motor terminals, wherein the filter circuit comprises a flexible circuit assembly having a flexible printed circuit board (FPCB) and multiple filter elements mounted to the FPCB, wherein the stator includes a housing, and wherein the housing includes an end cap assembly with at least two end cap bodies disposed at one end of the stator nearest an operating end of the rotor, wherein each end cap body and the FPCB are provided with a through-hole through which the operating end of a shaft of the rotor passes.

2. The motor of claim 1, wherein the rotor includes the shaft, a rotor core mounted on the shaft, a commutator mounted on the shaft adjacent the rotor core, and a rotor winding wound about poles of the rotor core and electrically connected to the commutator,
   wherein two brushes are mounted on the end cap assembly and arranged to make sliding contact with the commutator, and
   wherein the filter circuit is electrically connected between the motor terminals and the brushes.

3. The motor of claim 1, wherein the FPCB includes a flexible substrate, and a first electric contact and a second electric contact extending from the flexible substrate and bent relative to the flexible substrate, the first electric contact and the second electric contact are directly connected to the motor terminals respectively.

4. The motor of claim 3, wherein the first electric contact and the second electric contact are welded to the motor terminals.

5. The motor of claim 3, wherein the first electric contact and the second electric contact are connected to the two motor terminals by ultrasonic welding.

6. The motor of claim 1, wherein the end cap assembly includes a metal cap body, the FPCB includes a third electric contact extending from the flexible substrate and bent relative to the flexible substrate, and the third electric contact is connected to the metal cap body.

7. The motor of claim 1, wherein the end cap assembly includes a first cap body and a separately formed second cap body, the flexible circuit assembly is sandwiched between the first cap body and second cap body.

8. The motor of claim 1, wherein the end cap assembly has an electrical insulating cap body with multiple recesses accommodating the multiple filter elements, the FPCB is mounted to the electrical insulating cap body.

9. The motor of claim 1, wherein the filter circuit includes two chokes supported by the end cap assembly, and ends of each choke are electrically connected to a respective one of the motor terminals and a corresponding one of the brushes.

10. The motor of claim 9, wherein the end cap assembly includes an electrically insulating cap body having a first side and a second side axially spaced from the first side, and the flexible circuit assembly is disposed on the first side and the chokes are disposed on the second side of the cap body.

11. The motor of claim 1, wherein the filter elements include a resistor branch circuit, a first capacitor branch circuit and a second capacitor branch circuit that are connected in parallel between the motor terminals; the resistor branch circuit includes two resistors connected in series, the first capacitor branch circuit includes two capacitors connected in series; the second capacitor branch circuit includes a single capacitor, and the joint between the two resistors and the joint between the two capacitors of the first capacitor branch circuit are grounded.

12. The motor of claim 1, wherein the filter elements are surface mounted device elements.

13. The motor of claim 1, wherein the FPCB is a single-side film circuit board with a thickness of 0.1 mm to 0.2 mm.

14. The motor of claim 1, wherein the FPCB is a double-sided film circuit board with a thickness of 0.2 mm to 0.3 mm.

15. The motor of claim 1, wherein the end cap assembly includes a first cap body and a separately formed second cap body, and wherein the second cap body includes two motor terminals.

16. An electric motor, comprising:
    two motor terminals;
    a stator having a housing, and an end cap assembly detachably mounted to one end of the housing, the end cap assembly having a first cap body made of metal material, and a second cap body made of electrical insulating material disposed in the inner side of the first cap body;
    a rotor rotatably mounted with respect to the stator; and
    a filter circuit for suppressing electro-magnetic interference, connected to the motor terminals, the filter circuit comprising a flexible circuit assembly having a flexible printed circuit board (FPCB) and multiple filter elements mounted to the FPCB, wherein the FPCB is mounted to the second cap body and having at least an electric contact bent by the FPCB and contacting the motor terminal or the first end cap body.

17. The electric motor of claim 16, wherein the number of the at least one electric contact is three, the three electric contacts are integrally formed with the FPCB, two of the three electric contacts are connected to the motor terminals respectively, and a remaining third electric contact is connected to the first end cap body.

18. An electric motor, comprising:
    two motor terminals;
    a stator having a housing, and an end cap assembly detachably mounted to one end of the housing, the end cap assembly having a first cap body made of metal material, and a second cap body made of electrical insulating material connected to the inner side of the first cap body;
    a rotor rotatably mounted with respect to the stator; and
    a filter circuit for suppressing electro-magnetic interference, connected to the motor terminals, the filter circuit comprising a flexible circuit assembly having a flexible printed circuit board (FPCB) and multiple filter elements mounted to the FPCB, wherein the FPCB is detachably sandwiched between the second cap body and the first cap body.

19. The electric motor of claim 18, wherein the FPCB is mounted to a side of the second cap body facing the first cap body, the second cap body defines a plurality of recesses for accommodating the filter elements of the FPCB.

20. The electric motor of claim 19, wherein three electric contacts are integrally formed with the FPCB, two of the three electric contacts are connected to the motor terminals respectively, and a remaining third electric contact is connected to the first end cap body.

* * * * *